United States Patent [19]

Endo

[11] Patent Number: 4,544,236
[45] Date of Patent: Oct. 1, 1985

[54] TURRET

[75] Inventor: Itaru Endo, Hachiouji, Japan

[73] Assignee: Olympus Optical Co., Ltd., Tokyo, Japan

[21] Appl. No.: 437,756

[22] Filed: Oct. 29, 1982

[30] Foreign Application Priority Data

Nov. 2, 1981 [JP] Japan .............................. 56-163872[U]
Nov. 2, 1981 [JP] Japan .............................. 56-163873[U]

[51] Int. Cl.⁴ .............................................. G02B 7/16
[52] U.S. Cl. ..................................... 350/247; 350/254
[58] Field of Search ..................... 350/247, 254, 522

[56] References Cited

U.S. PATENT DOCUMENTS 4,307,940 12/1981 Hagedorn-Olsen ................ 350/254

FOREIGN PATENT DOCUMENTS 56-36614 4/1981 Japan .
133415 8/1982 Japan ................................... 350/354

Primary Examiner—John K. Corbin
Assistant Examiner—Lynn V. Kent
Attorney, Agent, or Firm—Cushman, Darby & Cushman

[57] ABSTRACT

A turret wherein, in order that the assembly may be easy and a turret board may be stopped accurately in a predetermined position, the turret board provided with a plurality of notches is connected with a driving plate so as to be relatively rotatable in a slight range and the driving plate is so made as to be stopped by the cooperation of incisions provided in response to the respective notches in the turret board with a detecting element or the cooperation of a locking member with the detecting element just after the locking member engages with one of the notches. The detecting element is such photoelectric element as a photointerrupter.

3 Claims, 7 Drawing Figures

TURRET

BACKGROUND OF THE INVENTION (a) Field of the Invention

This invention relates a turret (rotary lens exchanging device) and more particularly to a device whereby a turret board holding a plurality of lenses having different focal distances (magnifications) is stopped by a signal detected by a detecting element so that any desired lens can be positioned accurately on the light path.

(b) Description of the Prior Art

This kind of turret, for example, by Japanese Patent Laid Open No. 36614/1981 is known. It shall be explained with reference to FIG. 1. The reference numerals $1a$, $1b$ and $1c$ denote lenses respectively different in the focal distance (magnification). The reference numeral 2 denotes a turret board rotatably arranged around a center axis and fitted with the lenses $1a$, $1b$ and $1c$, 3 denotes a slit plate formed separately from the turret board 2, rotatably arranged coaxially with the turret board 2 and having a tooth part $3a$ formed on the outer periphery and meshed with a pinion 5 of a driving moter 4, 6 denotes an interlocking pin secured to the turret board and engaged with an incision $3b$ formed in the slit plate 3 so as to be relatively rotatable by some range, 7 denotes a photosensor which detects slits $3c$ formed in response to the respective lenses $1a$, $1b$ and $1c$ in the flange part of the slit plate 3 and is arranged so as to be able to detect the respective slits just before the lenses corresponding respectively to the slits $3c$ reach predetermined positions and 8 denotes a locking member which can engage with notches $2a$ formed on the outer periphery of the turret board 2 in response to the respective lenses $1a$, $1b$ and $1c$, is biased clockwise by a spring 9 and is so arranged that, when the turret board 2 is stopped in a position of engaging with the notch $2a$, the lens corresponding to the notch $2a$ will be accurately positioned. Therefore, when the driving motor 4 is driven by a signal for commanding the conversion of the lens, the slit plate 3 will be rotated and this rotation will be transmitted to the turret board 2 through the interlocking pin 6. When the photosenser 7 detects a predetermined slit $3c$, the driving moter 4 will be stopped and the slit plate 3 will stop at the same time but the turret board 2 formed so as to be able to relatively rotate in some range will continue to rotate due to the inertia within the range. When the locking member 8 engages with the notch $2a$, the turret board 2 will stop accurately in a predetermined position.

However, in the above mentioned device, just before the lenses corresponding the respective slits $3c$ reach predetermined positions, the photosenser 7 will detect the respective slits $3c$ to stop the moter 4 and, by the rotating inertia of the turret board 2 and the biasing force of the locking member 8 based on the spring 9, the turret board 2 will be positioned. Therefore, the locking position of the locking member 8, the positions of the notches $2a$ of the turret board 2, the positions of the slits $3c$ of the slit plate 3 and the detecting position of the photosenser 7 must be respectively accurately determined and the assembling has been difficult. Further, as the photosenser 7 generally has an expansion of the emitted light bundle to some extent and in case the slit plate 3 rotates slowly, the light bundle detected by the photointerrupter at the time of detection will gradually increase, therefore, together with the fluctuation of the reflection factor of the light, the detecting precision will fluctuate and particularly, in case a reflective photointerrupter is used for the detecting element, the detected light will become a diffused light and has not been adapted to this kind of structure.

SUMMARY OF THE INVENTION

Therefore, a primary object of the present invention is to provide a turret whereby the accurate positioning of position indexes to be detected by a detecting element and a clicking mechanism for stopping a turret board is simple and the fluctuation of the detecting precision of the detecting element is reduced.

According to the present invention, this object is attained by providing a turret board with a plurality of engaging parts which are formed in response to respective lenses and with which a locking member can engage and a plurality of position indexes arranged in response to the respective engaging parts and to be detected by a detecting element so that, when the locking member engages with one of the engaging parts to lock the turret board, the detecting element will be able to detect one of the position indexes to stop a driving motor rotating the turret board.

According to a preferred formation of the present invention, the engaging parts are formed as notches on the peripheral edge of the turret board and the position indexes are formed as light reflecting slits extending in the rotary axial direction of the turret board on the peripheral surface of the turret board. The position indexes may be formed as incisions on the peripheral edge of the turret board.

According to another preferred formation of the present invention, engaging parts serve also as position indexes and a locking member is so arranged as to be able to cooperate with a detecting element so that, when the locking member engages with one of the engaging parts, a signal will be issued from the detecting element by the movement of the locking member to stop a driving moter. In this case, the engaging parts may be formed as notches on the peripheral edge of the turret board. The detecting element may be such photoelectric element as a reflection -or transmission- type photointerrupter.

DESCRIPTION OF THE PREFERRED EMBODIMENTS

Figure 1:
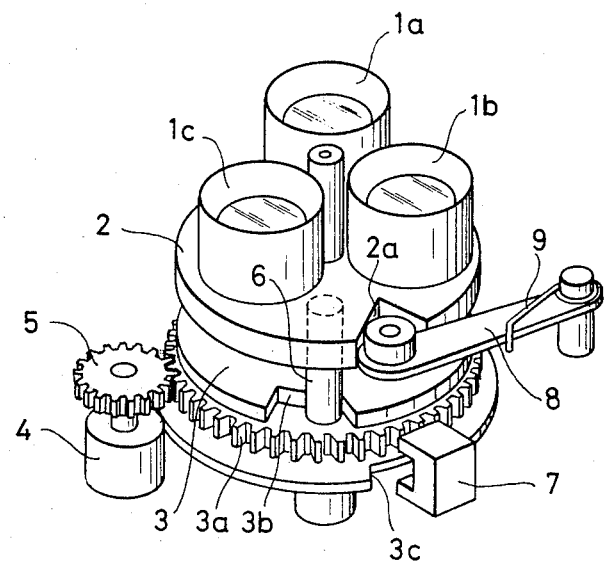
FIG. 1 is a perspective view showing an example of a conventional turret.
Figure 2:
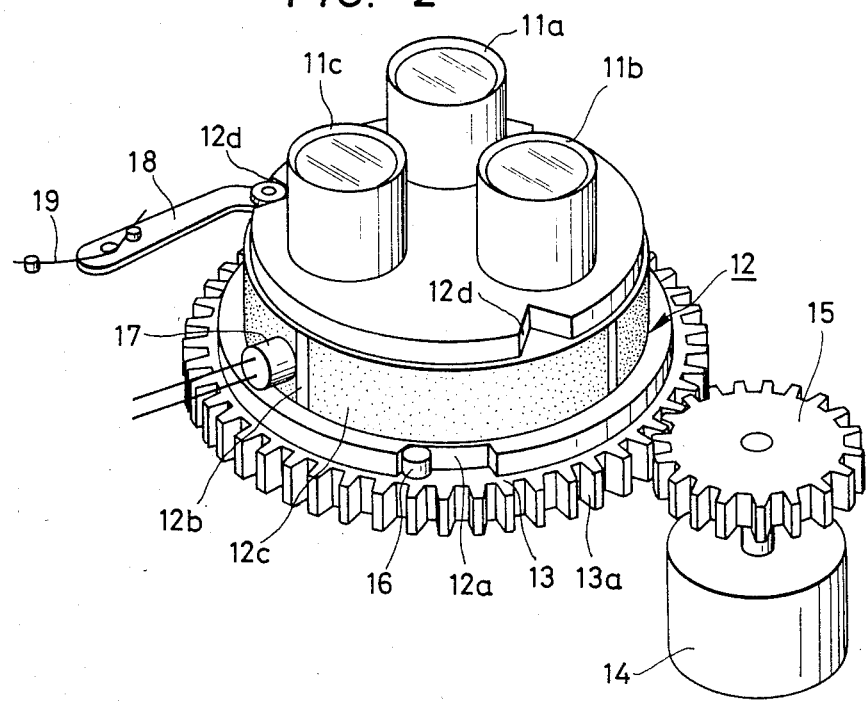
FIG. 2 is a perspective view showing an embodiment of a turret according to the present invention.

First, the embodiment shown in FIG. 2 shall be explained. The reference numerals $11a$, $11b$ and $11c$ denote objective lenses of respectively different magnifications and the reference numeral 12 denotes a turret board arranged rotatably around the center axis and fitted with the lenses $11a$, $11b$ and $11c$. The reference numeral 13 denotes a driving plate formed separately from the turret board 12, rotatably arranged coaxially with the turret board 12 and having a tooth part 13a formed on the outer periphery and meshed with a pinion 15 of a driving motor 14. The reference numeral 16 denotes an interlocking pin secured on the driving plate 13 so that, when it engages with an incision 12a formed on the peripheral edge of the turret board 12, the turret board 12 and driving plate 13 will be able to relatively move in some range in the rotating direction. The reference numeral 17 denotes such detecting element as a reflection-type photointerrupter for detecting light reflecting slits 12b serving as position indexes formed in the positions corresponding to the respective lenses 11a, 11b and 11c on the outer peripheral surface of the turret board 12 so that, when the lenses corresponding to the respective light reflecting slits 12b reach a predetermined position, the respective light reflecting slits 12b will be able to be detected. By the way, the other peripheral surface parts 12c and the light reflecting slits 12b formed on the outer peripheral surface of the turret board 12 are made non-reflective so as not to reflect the light. The reference numeral 18 denotes a locking member engageable with engaging parts or notches 12d formed on the outer peripheral edge of the turret board 12 in response to the respective lenses 11a, 11b and 11c and biased clockwise by a spring 19 stretched between the locking member 18 and a stationary pin so that, when the turret board 12 is stopped in the position of engaging with the notch 12d, the lens corresponding to the notch 12d will be positioned accurately in the predetermined position.

Figure 3:
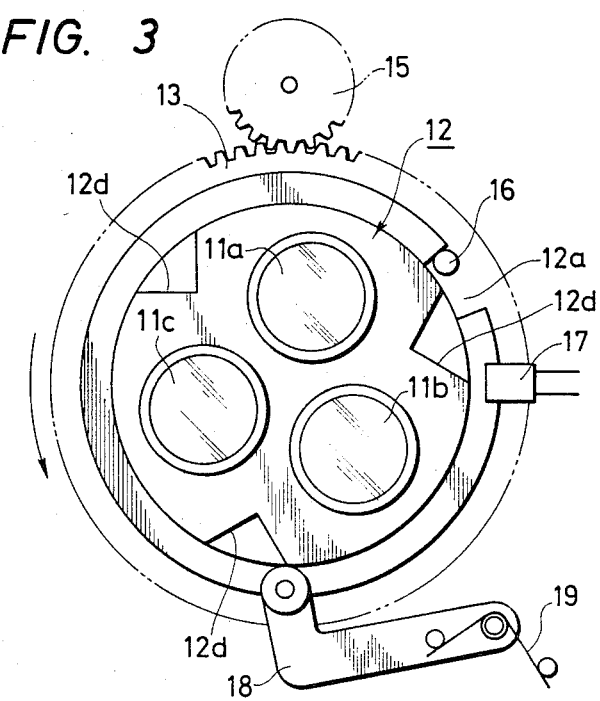
FIG. 3 is a plan view of the device in FIG. 2, showing a locking member as just before engaging with a notch.
Figure 4:
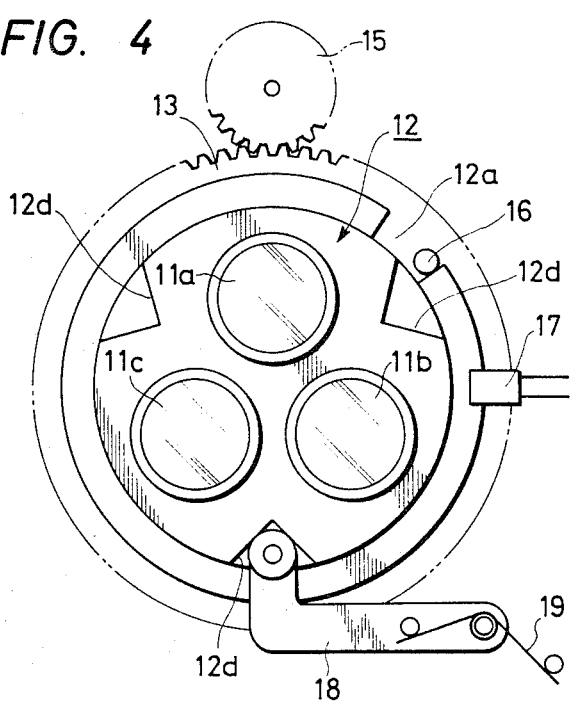
FIG. 4 is the same plan view as FIG. 3, showing the locking member as engaged with the notch.

The operation of the embodiment of the present invention formed as in the above shall be explained with reference to FIGS. 3 and 4. FIG. 3 shows the locking member 18 as just before falling into the notch 12d of the turret board 12 when the turret board 12 is rotated in the direction indicated by the arrow. In this position, the photointerrupter 17 will not detect the light reflecting slit 12b and therefore the driving motor 14 will be rotating. When the locking member 18 is about to fall into the notch 12d, due to the existence of an arcuate incision 12a of the turret board 12 under the rotating inertia of the turret board 12 and the biasing force of the locking member 18 by the spring 19, the turret board 12 will proceed to the predetermined position momentarily prior to the driving plate 13, the locking member 18 will simultaneously perfectly fit the notch 12d to be as shown in FIG. 4 and the desired lens will be positioned. At this time, the driving plate 13 will continue to rotate so as to follow the turret board 12 but, as soon as the turret board 12 is stopped in the locking position in FIG. 4, the photointerrupter 17 will detect the light reflecting slit 12b and therefore, by this detecting signal, the driving motor 14 will be stopped and the driving plate 13 will stop. Even if a time delay from the detection of the light reflecting slit 12b by the photointerrupter 17 to the stop of the driving plate 13 is caused here, it will be absorbed by the existence of the arcuate incision 12a and therefore the turret plate 12 will not be moved from the locking position. By the way, in the above described embodiment, the position is detected by detecting the reflected light. However, the position can be detected also by a reverse logic by reversing the reflecting part and non-reflecting part with each other.

Figure 5:
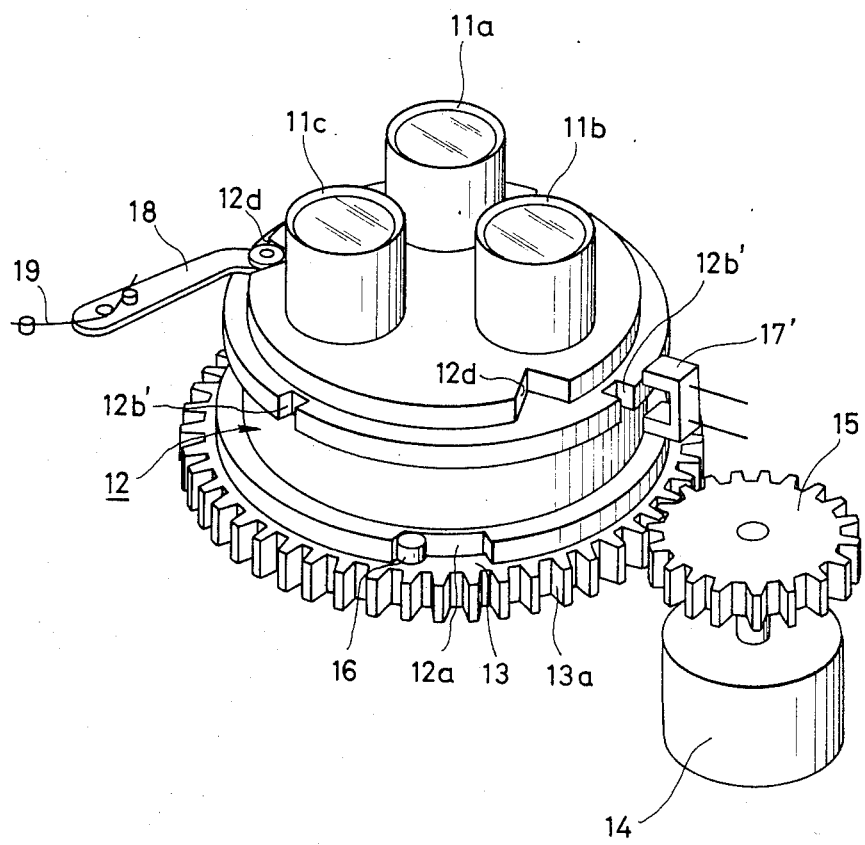
FIGS. 5 to 7 are the same perspective views as FIG. 2, showing other embodiments different from each other according to the present invention.

FIG. 5 shows another embodiment of the same structure as of the embodiment explained above on the basis of FIG. 2 except the position detecting mechanism. In this case, a position detecting mechanism is formed of such photoelectric element as a transmission-type photointerrupter and incisions 12b' as position indexes corresponding to the respective lenses 11a, 11b and 11c and provided on the peripheral edge of the flange part of the turret board 12. Its operation is the same as of the embodiment in FIG. 2 and therefore shall not be explained.

Figure 6:
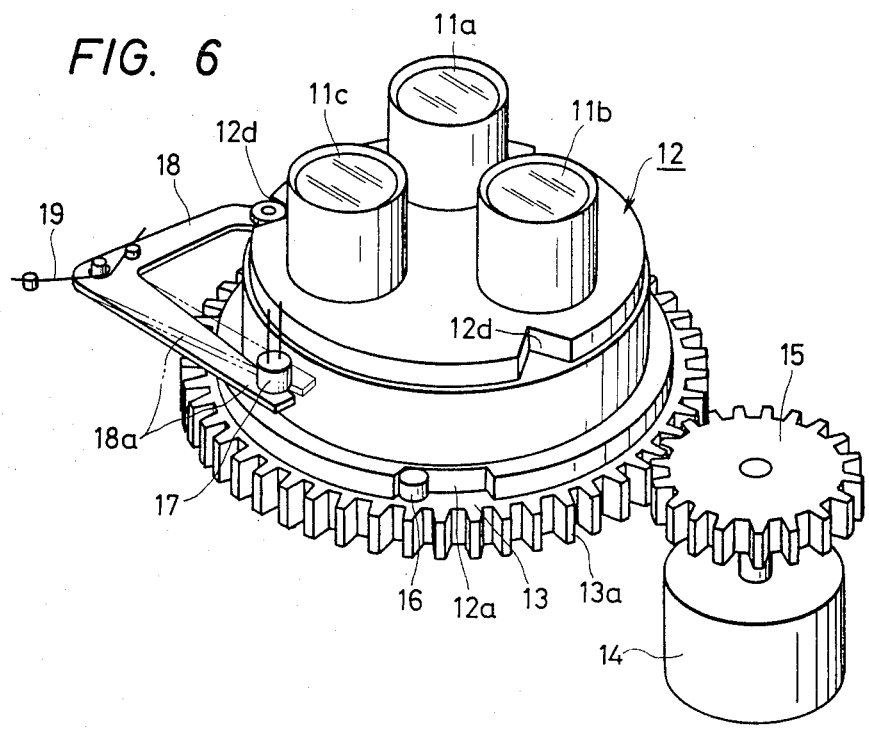
Figure 7:
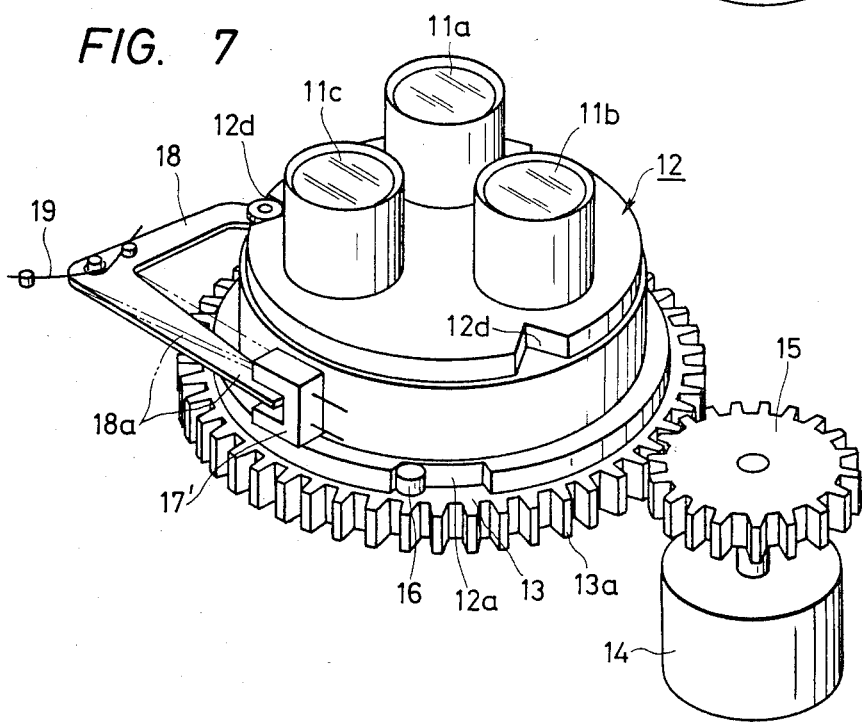

In each of the above explained embodiments, the stopping position detecting mechanism for the turret board 12 comprises the position indexes 12b or 12b' and the detecting element 17 or 17' set as opposed to them. However, this stopping position detecting mechanism can be formed also of the engaging parts 12d, locking member 18 and detecting element 17 or 17' set opposite the locking member. FIGS. 6 and 7 show two embodiments respectively somewhat different from each other of such formation. That is to say, in these embodiments, the notches 12d play the part as of the position indexes 12b in the already explained embodiments and the locking member 18 is formed as a two-arm lever cooperating at the tip of one arm 18a with the detecting element so as to be able to issue a motor stopping signal. In the embodiment shown in FIG. 6, the arm 18a of the locking member 18 is formed at the tip as a reflecting surface and such photoelectric element 17 as the reflection-type photointerrupter is so set as to be able to be opposed to this reflecting surface. In the embodiment shown in FIG. 7, such photoelectric element as the transmission-type photointerrupter 17' is used as the detecting element.

Therefore, according to these embodiments, when the locking member 18 perfectly engages with one of the notches 12d and the desired lens is positioned, the driving plate 13 will still continue to rotate but, when the arm 18a is moved at the tip from the position indicated by the chain lines to the position indicated by the solid lines in FIGS. 6 and 7, the photointerrupter 17 or 17' will issue a signal, the driving motor 14 will be stopped and the driving plate 13 will be stopped. In this case, even if there is a time delay from the movement of the locking member 18 to the stop of the driving plate 13, it will be absorbed by the relative mevement of the driving plate 13 with the turret board 12 and therefore the turret board 12 having once stopped will not be moved.

By the way, it is also possible to form the arm 18a of the locking member 18 so as to be opposed to the photointerrupter 17 or 17' when the locking member 18 does not engage with one of the notches 12d and to detect the position by a reverse logic. Further, if the distance to the detecting position at the tip of the arm 18a is taken to be large enough for the distance to the turret board from the rotary axis of the locking member 18, the detecting precision will become higher and, even if the movement of the locking member is small, accurate detection will be possible.

As described above, according to the present invention, the engaging parts 12d of the turret board required to be accurately positioned and the indexes 12b for detecting the stopping position are arranged in the turret board 12, therefore positioning in making is easy and positioning at the time of assembling is not required. Further, even in case the rotating speed of the turret board is very slow, the turret plate 12 will rotate at a high speed just before the detecting element, that is, the photointerrupter 17 or 17' detects the position index 12b and therefore an accurate stopping position will be able to be detected substantially digitally without being influenced by the expansion of the emitted light bundle of the photointerrupter and the fluctuation of the reflection factors of the position indexes. Therefore, the accurate positioning of the detecting element and the turret board locking mechanism will be simple and the fluctuation of the detecting precision will be able to be remarkably reduced.

I claim:

1. A turret comprising a rotatable turret board holding thereon a plurality of lenses of different magnifications and having a plurality of notches serving as position indexes on the peripheral edge thereof each adjacent to a said respective lenses, a locking member formed as a two-arm lever one arm of which is engageable with any one of said plurality of notches to lock said turret board, a driving plate operatively connected to said turret board so as to be relatively rotatable by a predetermined range to rotate said turret board, a driving motor connected to said driving plate to rotate said driving plate, and a detecting element set near said turret board and cooperating with the other arm of said two-arm lever to issue a signal for stopping said driving motor when the one arm of said two-arm lever engages with one of said plurality of notches to lock said turret board and said other arm including a tip part.

2. A turret according to claim 1, wherein said detecting element is a photoelectric element of the reflection-type photointerrupter type arranged so as to be able to be opposed to the tip part of the other arm of said locking member.

3. A turret according to claim 1, wherein said detecting element is a photoelectric element of the transmission-type photointerrupter type arranged so as to be able to be opposed to the tip part of the other arm of said locking member.

* * * * *